Dec. 10, 1929.  H. C. BRANDT  1,738,687
SCREW DRIVER AND DRILL MACHINE
Filed Aug. 23, 1928  2 Sheets-Sheet 1
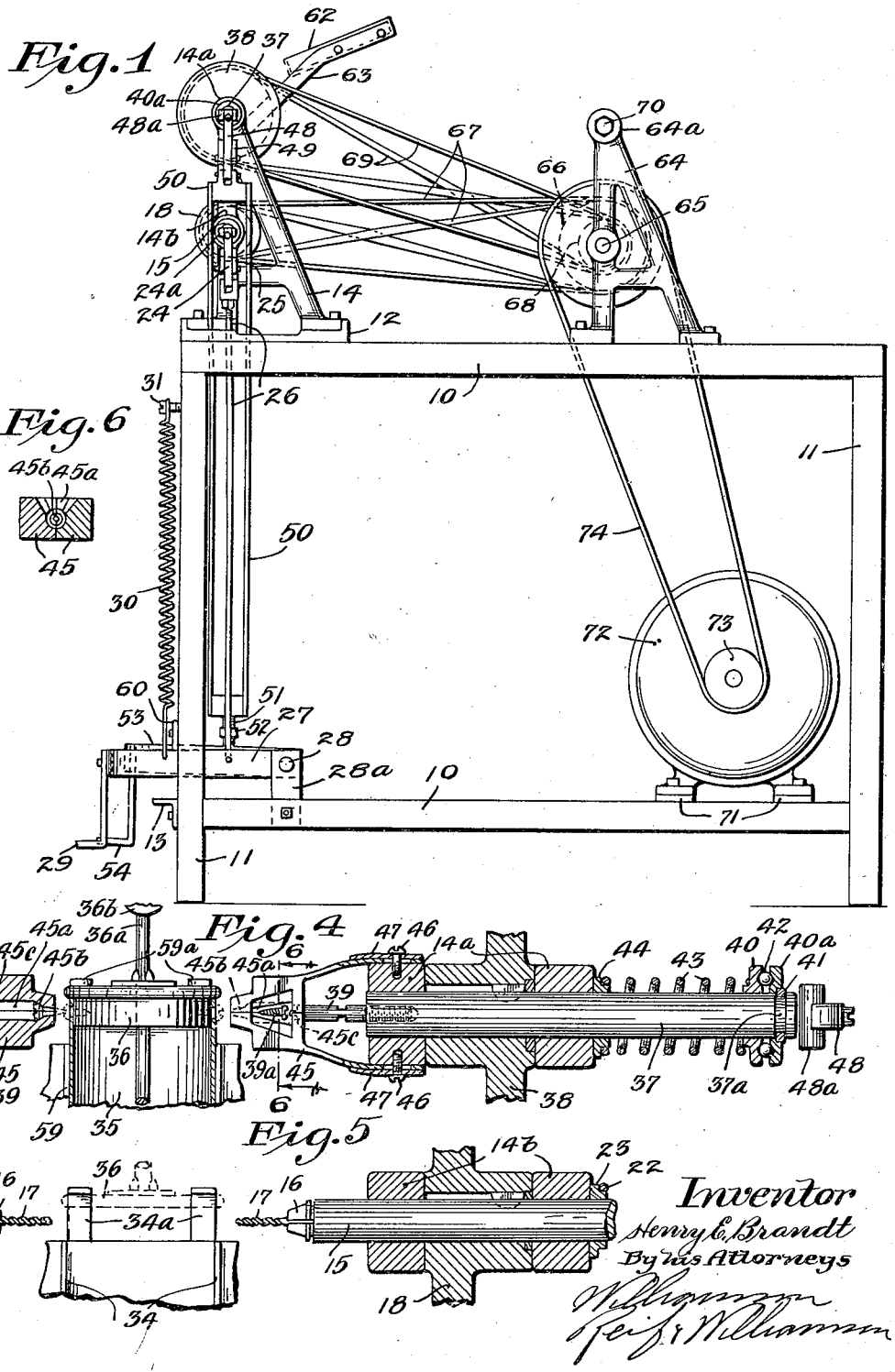

Dec. 10, 1929.　　　H. C. BRANDT　　　1,738,687
SCREW DRIVER AND DRILL MACHINE
Filed Aug. 23, 1928　　2 Sheets-Sheet 2
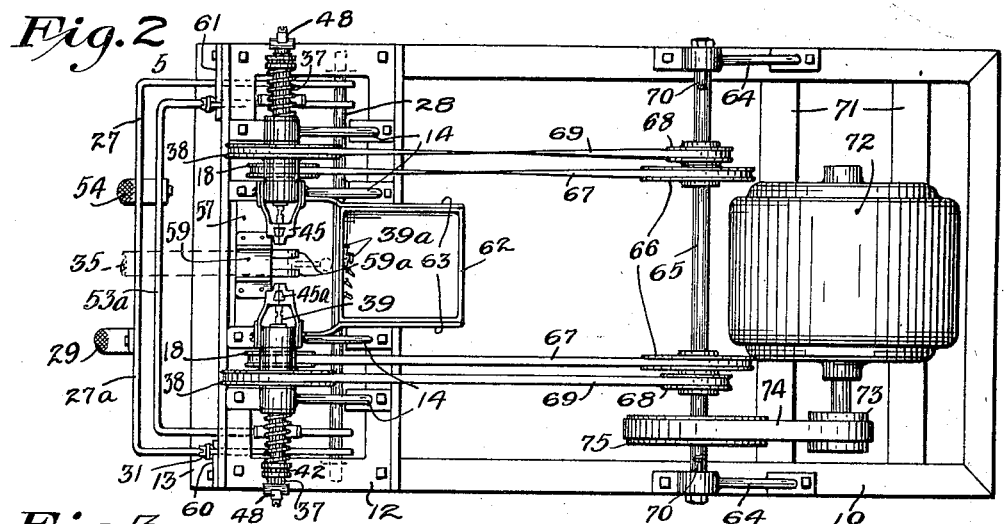
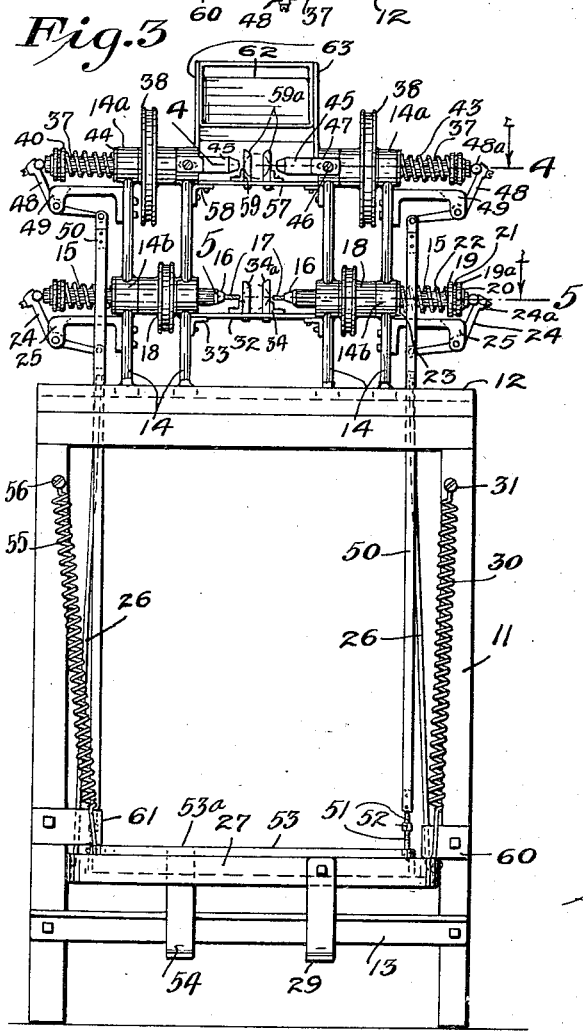
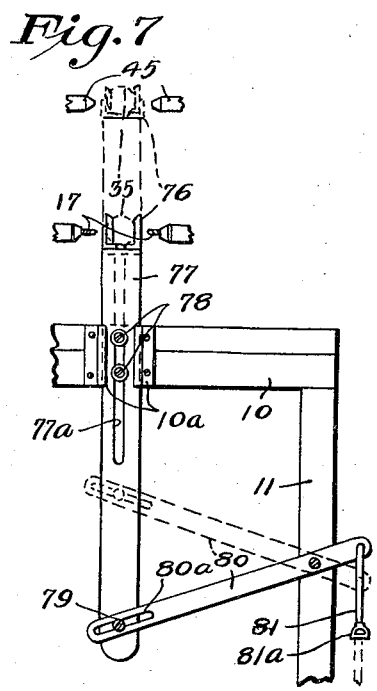
Inventor
Henry E. Brandt
By his Attorneys Patented Dec. 10, 1929

1,738,687

UNITED STATES PATENT OFFICE

HENRY C. BRANDT, OF ST. PAUL, MINNESOTA

SCREW DRIVER AND DRILL MACHINE

Application filed August 23, 1928. Serial No. 301,588.

This invention relates to a machine for operating upon articles having parts attached by screws. While the machine is applicable to various kinds of devices, it particularly is designed and adapted to work on the ends of pump cylinders such as used in sprayers comprising an air pump. The device operated upon has a metal cylinder with a flanged wooden plug closing the end thereof, which is held in place by screws passing through the metal into said plug. It has been the practice heretofore to drill the holes in opposite sides of the cylinder and plug successively, and then to insert screws therethrough by hand.

It is an object of this invention, therefore, to provide a machine by means of which the plugs can be secured in the cylinders with great rapidity, ease and accuracy.

It is a further object of the inveniton to provide a machine comprising means simultaneously drilling opposite sides of a cylinder and plug and having means for simultaneously inserting screws in opposite sides of the cylinder and plug.

It is more specifically an object of the invention to provide a machine comprising vertically alined means for respectively drilling opposite sides of a cylinder and plug and inserting screws in opposite sides of the cylinder and plug with vertically alined means for holding the cylinder and plug in relation to said first mentioned means, which last mentioned means may be a common and vertically movable means.

These and other objects and advantages of the invention will be fully set forth in the following description made in connection with the accompanying drawings, in which like reference characters refer to similar parts throughout the several views and in which :—

Fig. 1 is a view in side elevation of the machine;

Fig. 2 is a plan view of the machine;

Fig. 3 is a view in front elevation of the machine;

Fig. 4 is a horizontal section taken on line 4—4 of Fig. 3;

Fig. 5 is a horizontal section on the line 5—5 of Fig. 3;

Fig. 6 is a vertical section on line 6—6 of Fig. 4; and

Fig. 7 is a partial view similar to Fig. 3, showing a modification.

Referring to the drawings, a machine is shown comprising a frame having the rectangular portions 10 spaced vertically thereof, and the leg forming corner posts 11. Said frame also includes a transverse plate 12 extending across the upper frame 10 and the bar 13 extending across and between the front posts 11. The plate 12 has pairs of bearing brackets 14 secured adjacent either end thereof, having upper bearings $14^a$ and lower bearings $14^b$. Journaled in the lower bearings $14^b$ of the bars respectively are shafts 15 having drill chucks 16 disposed and secured therein at their front ends, adapted to removably hold the drill members 17. Driving pulleys 18 are secured to the shafts 15 between the brackets 14. The shafts have thereon slidable collars 19 forming part of a ball thrust bearing, the other part of which is formed by collars $19^a$ which collars are grooved to receive a split washer 20 fitted in the groove in shaft 15, balls 21 being disposed between and in races formed in collars 19 and $19^a$. Springs 22 are disposed between the collars 19 and washers 23, engaging the outer side of the outer bearing $14^b$, said springs thus holding shafts 15 outwardly. Bell crank levers 24 have cylindrical blocks $24^a$ at the inner sides of their upper ends, engaging the outer ends of shafts 15, said levers 24 being pivoted on brackets 25 secured to the outer brackets 14 and said levers have link rods 26 secured to their lower arms which extend downwardly and are secured to the sides of a pedal lever 27 having side portions pivoted at their inner ends to a rod 28 secured in brackets $28^a$ upstanding from and secured to the lower frame 10. The pedal lever 27 has a front portion extending across the front of the frame to which an angular pedal 29 is secured. The pedal lever 27 has secured thereto the lower end of a tensile spring 30, the upper end of which is secured to a screw 31 in one of the front posts 11. A bar 32 extends between the inner brackets 14 immediately below the inner bearings $14^b$ being secured to angle members 33 secured to said bracket and said bar carries a bracket 34 particularly formed to support the end of a pump cylinder 35 operated upon with its plug 36.

The upper bearings 14ª have journaled in the pairs thereof respectively, shafts 37. Said shafts have secured thereto between the bearings 14ª, the pulleys 38. The shafts 37 have threaded sockets in their inner ends adapted to receive the screw driving members 39. Said shafts also have at their outer ends slotted collars 40 forming part of the thrust bearing, comprising also collars 40ª on shaft 37 grooved to receive a split washer 41 disposed in the groove 37ª of said shaft, balls 42 being disposed between and in recesses formed in collars 40 and 40ª. Compression coil springs 43 are disposed between collars 40 and washers 44 engaging the outer side of the outer bearings 14ª. The inner bearings 14ª have secured thereto a holder 45 comprising a pair of similarly formed brackets having a recess 45ª therein adjacent their forward ends, from which leads a tapered opening 45ᵇ in axial alinement with shafts 37. The recess 45ª also has an opening 45ᶜ leading from the rear thereof, in axial alinement with shaft 37 through which member 39 is adapted to pass. The members 45 are secured to bearings 14ª by screws 46 passing through slots in the arms of the member 45 which are overlaid by resilient plates 47. Bell crank levers 48 are pivoted to brackets 49 secured to the outer upper sides of the outer brackets 14 and have at their upper ends cylindrical blocks 48ª engaging the outer ends of shafts 37. The lower inner ends of levers 48 have connected thereto the link bars 50 which extend downward and are adjustably connected at their lower ends, by the threaded rods 51 engaged by a turn buckle 52, to a treadle lever 53. The lever 53 also has side portions pivoted at their ends to the brackets 28, and has a front portion 53ª extending across the front of the frame to which is secured a pedal 54. The lever 53 is moved upwardly by a tensile spring 55 secured thereto and to a screw 56 in the front of one of the posts 11. A bar 57 extends between the inner brackets 14 immediately below bearings 14ª, being secured on angle members 58, which bar carried a supporting plate 59 particularly adapted to hold the cylinder 35 and plug 36. It will be seen that the brackets 34 and 59 have spaced inwardly projecting arms 34ª and 59ª respectively, which have their ends upturned to form abutments against which the end of plug 36 is placed. Said brackets also have their upper central portions formed as a trough for receiving the cylinder 35. Said plug 36 is shown as having the pump rod 36ª extending centrally therethrough, a portion of the handle 36ᵇ also being shown. The pedal levers 27 and 53 are limited in their upward movement respectively by stop members 60 and 61 respectively comprising bars secured to the front portion of the front posts 11. A hopper 62 is disposed between the inner bearings 14ª and secured thereto by brackets 63 at each side of said hopper.

Brackets 64 are secured to the sides of the top frame 10 adjacent the rear thereof, having bearings in which is journaled a shaft 65. Said shaft has a pair of similar pulleys 66 thereon, alined with the pulleys 18, belts 67 running over said pulleys and pulleys 18, one of said belts being a crossed belt. Said shaft also has thereon outward of the pulleys 66 another pair of pulleys 68 alined with the pulleys 38, belts 69 running over pulleys 38 and 68, one of which belts is also a crossed belt. A rod 70 in the form of a headed and nutted bolt extends through the top bosses 64ª of bracket 64, thus securing said brackets together, said rod being partly broken away in Fig. 2. Bar 71 extends across the rearward part of lower frame 10 to form a supporting means for a motor 72 shown as of the electrical type. Said motor has a driving pulley 73 thereon, over which runs a belt 74 also running over the pulley 75 secured to shaft 65 for driving the latter.

In operation the parts of the machine will normally appear as shown in Figs. 1 to 3. Springs 30 and 55 will elevate the pedal levers 27 and 53 and the springs 22 and 43 will move the shafts 15 and 37 outwardly. Said shafts will be driven through belts 67 and 69 from the shaft 65 which will in turn be driven by belt 74 from the motor 72. The operator now takes one of the cylinders 35 with the plug 36 therein and places the same on the support 34 so that a portion of plug 36 within the cylinder is centrally alined with the axis of the drills 17. The operator now presses on the pedal 29, depressing pedal lever 27 and the link rods 26 so that the shafts 15 are moved inwardly by lever 25, springs 22 being compressed. The drills 17 are then moved inwardly and drill holes through the sides of the cylinder and into the plug 36. The cylinder 36 and plug 35 are then placed on support 59, which support is similar to support 34 and is arranged in the same relation to the members 39 as support 34 is arranged to the drill 17. The operator now places the screw in the recesses 45ª of each of the brackets 45 in the position illustrated in Fig. 4. He then presses on the treadle 54, depressing pedal lever 53 and link bars 50. Levers 48 are swung and move the shafts 37 inwardly. The screw 39ª is engaged by the tang on the end of member 39 and the screw is forced through the opening 45ᵇ into the holes drilled in the cylinder 35 and plug 36 and screwed into place by the rotation of members 39. The screws are thus firmly applied and the portions 35 and 36 secured together.

In the modification shown in Fig. 7, the same frame and brackets 14 are used, carrying the shafts 15 and 37 with the attached parts. The support members 32, 33 and 34, and 57, 58 and 59 are omitted and a support 76 is used, similar to the supports 34 and 59, which is carried at the upper end of the vertical sliding member 77 sliding in guides 10ª formed in the front upper frame 10. The member 77 has an elongated slot 77ª therein through which passes the spaced headed screws 78 secured in the frame 10. Said slide is pivotally connected at its bottom by a pivot 78 to a lever 80, said lever having an elongated slot 80ª through which said pivot 78 extends. A pedal bar 81 depends from the outer end of lever 80, having a handle 81ª at its lower end.

In the operation of the structure shown in Fig. 7, the slide 77 normally will be at its lowest position with the top of the slot 77ª against the upper bolt 78. The cylinder 35 and plug 36 will be placed in the bracket 76 and in the lower position of slide 77, this will bring the sides of plug 36 substantially centrally alined with the drill 17. The operator now presses on pedal 29 as before described and drills 17 are moved inwardly drilling the holes in the cylinder and plug. The operator then presses downwardly on handle 81ª and can in the meantime hold the cylinder and plug in the bracket 76 if desired, with his left hand. The slide 77 is moved upwardly until the lower part of the slide 77 engages the lower bolt 78, at which time the axes of the holes drilled in the cylinder 35 and plug 36 are in alinement with the axes of members 39. Screws are placed in the member 45 and the operator then presses on pedal 54 and members 39 are moved inwardly, turning the screws into place in members 35 and 36 and securing the same together. The operation of placing the screws is thus quickly and easily accomplished.

From the above description it is seen that applicant has provided a simple and efficient machine by which the two members are secured together in firm and accurate condition and the operation is completed with great rapidity. Not only is the operation performed much more rapidly than was previously done by hand, but the work is more accurate and uniform. The parts of the machine are comparatively few and the same is easily maintained as well as being easy and rapid in operation. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A machine for securing two parts of a device together with screws, having in combination, a frame, means for drilling a hole supported on said frame, means for driving a screw into said hole by a rotative action supported on said frame, and a supporting means for said device relatively to which said drilling means and second mentioned means bear a similar relation, and means for moving said drilling means and second mentioned means successively towards said supporting means to first drill, and then apply a screw to said device.

2. A machine for securing two parts of a device together with screws, having in combination, a frame, oppositely disposed drilling means supported on said frame, oppositely disposed screw applying means supported on said frame, and supporting means for holding the said device relatively to which said drilling means and screw applying means bear a similar relation, and means for moving said drilling means and screw applying means towards said supporting means successively, to first drill holes in the opposite sides of said device and then apply screws in said holes.

3. A machine for securing two parts of a device together with screws, having in combination, a frame, oppositely disposed drilling means mounted in said frame, oppositely disposed screw applying means mounted in said frame, means for driving said drilling and screw applying means from a common shaft journaled in said frame, a motor on said frame for rotating said shaft, and supporting means for said device for holding the same in similar relation to said drilling means and screw applying means, and means for successively moving said drilling means and screw applying means towards said support to first drill said device and then apply the screws thereto.

4. A machine for securing two parts of a device together with screws, having in combination, a frame, oppositely disposed drilling means mounted in said frame, oppositely disposed screw applying means mounted in said frame, said means being mounted with their axes in the same vertical plane, supporting means for holding said device in a similar relation to said drilling and screw applying means, and means for successively moving said drilling means and screw applying means towards said support for first drilling and then applying screws to said device.

5. A machine for securing two parts of a device together with screws, having in combination, a frame, oppositely disposed drilling means mounted in said frame, oppositely disposed screw applying means mounted in said frame, and a support for said device movable to one position with said device alined with said drilling means for drilling holes in said device, and movable to another position with said holes axially alined with said screw applying means for applying screws to said device.

6. A machine for securing two parts of a device together with screws, having in combination, a frame, pairs of brackets secured at each side of said frame having upper and lower bearings, a pair of oppositely disposed drilling means mounted in the lower bearings of said brackets, a pair of oppositely disposed screw applying devices mounted in said upper brackets, means normally holding said drilling means in retracted position, means normally holding said screw applying means in retracted position, supporting means for said device adapted to hold the same in similar relation to said drilling means and screw applying device, and pedal operated means for moving said drilling means towards said supporting means to drill said device, and pedal means for moving said screw applying device towards said supporting means for applying screws to said device in the holes drilled by said drilling means.

7. A machine for securing two parts of a device together with screws, having in combination, a frame, shafts journaled in the upper bearings of each pair of said brackets respectively, having drill receiving and holding means at their inner ends, springs for holding said shafts to their outer positions, levers for moving said shafts inward, and pedal operated means for simultaneously swinging said levers and moving said shafts inwards, shafts mounted in the upper bearings of said brackets respectively, screw applying means carried in the inner ends of said last mentioned shafts, springs for holding said last mentioned shafts in their outer positions, levers engaging the outer ends of said shafts for moving the same inwardly, pedal means for simultaneously swinging said last mentioned levers to move said screw applying device and shafts inwardly, and supporting means for holding said device in alinement with said first mentioned shafts and drilling means for drilling holes in said device and for holding said device with said holes alined with said screw applying device for applying screws therein.

8. The method of securing together two parts, one of which surrounds the other, which comprises holding said parts in one position, simultaneously drilling a plurality of holes through the outer part and into the inner part, moving the parts to another position in the same relation and simultaneously applying screws to said parts in said holes.

9. The method of securing together two parts, one of which surrounds the other, which comprises holding said parts in one position, simultaneously drilling a plurality of holes through the outer part and into the inner part thereof from opposite sides, moving the parts vertically to another position in the same relation and simultaneously applying screws to said parts in said holes.

10. A machine for securing two parts of a device together with screws, having in combination, a frame, a support for said device, a member at each of two opposite sides of said support adapted to receive and guide a screw, rotative means for entering each of said members and engaging a screw therein to push the same from said members and rotate the screw and drive the same into said device and means for moving said last metioned means to engage the screw in each of said members and simultaneously rotate and drive the same into said device.

In testimony whereof I affix my signature.
HENRY C. BRANDT.